US008764060B2

(12) United States Patent
Chapman

(10) Patent No.: US 8,764,060 B2
(45) Date of Patent: Jul. 1, 2014

(54) CAMERA DOLLY JACK

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 44 days.

(21) Appl. No.: 13/042,326

(22) Filed: Mar. 7, 2011

(65) Prior Publication Data

US 2012/0228838 A1 Sep. 13, 2012

(51) Int. Cl.
*B60S 9/00* (2006.01)

(52) U.S. Cl.
USPC .......................................... 280/763.1; 254/418

(58) Field of Classification Search
USPC .............. 254/418, 422, DIG. 3, 94, 123, 116, 254/119, 120, 129, 131, 419, 242, 133 R; 280/763.1, 764.1; 293/111.1
See application file for complete search history.

(56) References Cited

U.S. PATENT DOCUMENTS

| | | | | | |
|---|---|---|---|---|---|
| 158,436 | A | * | 1/1875 | Plank | 280/35 |
| 177,514 | A | * | 5/1876 | Hollister | 254/123 |
| 429,686 | A | * | 6/1890 | Hinman | 254/123 |
| 843,292 | A | * | 2/1907 | McIntosh | 254/123 |
| 1,288,846 | A | | 12/1918 | Dannenbring | |
| 1,289,268 | A | * | 12/1918 | Robbins | 254/123 |
| 1,343,275 | A | * | 6/1920 | Mulvihill | 254/94 |
| 1,778,521 | A | * | 10/1930 | Deal | 254/94 |
| 1,807,802 | A | * | 6/1931 | Stevens | 254/94 |
| 1,955,649 | A | * | 4/1934 | Nuccio | 254/422 |
| 2,108,888 | A | * | 2/1938 | Gunter | 254/422 |
| 2,132,903 | A | * | 10/1938 | MacMurray | 254/94 |
| 2,207,640 | A | * | 7/1940 | Short | 254/422 |
| 2,270,004 | A | * | 1/1942 | Hines | 254/94 |

(Continued)

FOREIGN PATENT DOCUMENTS

| | | | |
|---|---|---|---|
| DE | 2824772 | A1 | 12/1979 |
| DE | 202005013911 | U1 | 1/2006 |

(Continued)

OTHER PUBLICATIONS

European Patent Office, Extended European Search Report and Search Opinion for EP12155910, dated Jun. 20, 2012.

(Continued)

*Primary Examiner* — Katy M Ebner
(74) *Attorney, Agent, or Firm* — Kenneth H. Ohrine; Perkins Coie LLP

(57) ABSTRACT

Apparatus and methods allow the wheels of a camera dolly to be quickly and easily changed by a single person. A dolly jack may have a leg attached to a foot and pivotable relative to the foot about a first axis. A jack rod is attached to the leg spaced apart from the first axis. An arm may be pivotally attached to the leg as desired, to provide greater mechanical advantage in lifting the camera dolly. Dolly wheels may be changed by inserting a jack rod into a receptacle on one side of the camera dolly, with the foot of the jack on the ground and with the jack leg substantially in a non-vertical position. The jack leg rotated into a second position wherein the jack leg is substantially vertical, with the dolly rolling slightly in the direction of the rotation. This lifts the side of the dolly sufficiently so that the front and back wheels, or wheel pairs, on the one side of the dolly are lifted off of the ground, allowing the wheels to be changed.

19 Claims, 7 Drawing Sheets

(56) References Cited

U.S. PATENT DOCUMENTS

| | | | | |
|---|---|---|---|---|
| 2,738,951 | A * | 3/1956 | Glass | 254/94 |
| 3,053,506 | A * | 9/1962 | Quinn | 254/119 |
| 3,321,183 | A * | 5/1967 | Risetto | 254/131 |
| 3,567,299 | A * | 3/1971 | Lundqvist | 312/199 |
| 3,652,056 | A * | 3/1972 | King | 254/94 |
| 3,733,051 | A * | 5/1973 | Bollinger | 254/94 |
| 3,985,338 | A * | 10/1976 | Herrmann | 254/131 |
| 4,536,009 | A * | 8/1985 | Ashworth | 280/755 |
| 4,815,569 | A * | 3/1989 | Norman | 188/5 |
| 4,991,893 | A * | 2/1991 | Gordon et al. | 294/17 |
| 5,215,289 | A * | 6/1993 | Jacobson | 254/422 |
| 5,234,197 | A * | 8/1993 | Wurdack | 254/94 |
| 5,628,610 | A * | 5/1997 | Stratman et al. | 414/680 |
| 6,015,254 | A * | 1/2000 | Keeler | 414/447 |
| 6,619,693 | B1 * | 9/2003 | Sproatt et al. | 280/764.1 |
| 6,719,307 | B1 | 4/2004 | Chapman | |
| 6,851,253 | B2 * | 2/2005 | Fontanes et al. | 56/16.7 |
| 7,182,361 | B2 * | 2/2007 | Lewoczko | 280/293 |
| 2008/0088103 | A1 * | 4/2008 | Sloat | 280/79.5 |

FOREIGN PATENT DOCUMENTS

| | | | |
|---|---|---|---|
| FR | 2828483 | A1 | 2/2003 |
| FR | 2850645 | A1 | 8/2004 |
| GB | 2463719 | A | 3/2010 |
| WO | 2007092599 | A2 | 2/2007 |

OTHER PUBLICATIONS

European Patent Office, additional Search Report and Search Opinion for EP12155910 dated Mar. 26, 2013.

* cited by examiner

CAMERA DOLLY JACK

BACKGROUND OF THE INVENTION

The field of the invention is camera dollies. More specifically, the application relates to a system for allowing quick change of wheels on a camera dolly. In motion picture or video filming, cameras are often supported on camera dollies, so that camera lens positions, angles, and elevations may be smoothly and easily achieved without interruption. Most camera dollies are pushed by "dolly grips" or camera dolly operators. For use on a relatively smooth and hard surface, such as on a sound stage, or other indoor set, the camera dolly is preferably provided with solid tires having relative high hardness, to reduce rolling friction, and make it easier to push and maneuver the camera dolly.

For use on more irregular surfaces, for example an indoor surface having small cracks, bumps, etc., a softer solid tire is preferred, to absorb shock impulses, albeit with a small increase in rolling friction. For use on still more irregular surfaces, pneumatic tires are typically used, to provide a higher degree of shock absorption, although with a greater increase in rolling friction. For use on unpaved surfaces, such as grass, sand, etc., or in other applications where a maximum level of smoothness in dolly movement is required, dolly track is laid down, with the dolly wheels rolling on the smooth metal rails of the track. Having a smooth rolling surface, or a way to absorb the shock impacts created when rolling over an irregular surface, is important, as shock impacts generated via the rolling movement of the camera dolly wheels can cause unacceptable movement of the camera lens during filming, resulting in unsteady recorded images.

It is frequently necessary to change the wheels on the camera dolly, to compensate for change in the ground conditions. For example, if a first part of a film sequence takes place indoors, the hard solid wheels may be used. Then, if the sequence continues outdoors, it may then be necessary to change over to a pneumatic or track wheel. While a combined track/pneumatic wheel, as described in U.S. Pat. No. 4,943,101, incorporated herein by reference, has been successfully used in the past, to avoid wheel changeover when switching between track and pneumatic wheels, it remains necessary to change wheels when the harder solid wheels are needed. In addition, fast wheel changes are assisted by the wheel system described in U.S. Pat. No. 6,349,994 B1, also incorporated herein by reference.

However, the dolly must still be lifted up to unweight the wheels, before the wheels can be changed. A typical unmotorized camera dolly weighs about 300 to 500 pounds. When loaded with crane arm and accessories, this can increase up to about 1200 pounds. The usual practice is generally for the dolly operators to simply manually lift and chock up one side of the dolly at a time, to change the wheels. While this technique works, it risks injury from heavy lifting. It also requires at least two people. Manual lifting can also damage the camera dolly if the lifting and chocking is not at a structural hard point of the camera dolly. Accordingly, there remains a need for designs which allow fast changeover of camera dolly wheels.

SUMMARY OF THE INVENTION

New apparatus and methods have now been invented which allow for fast changeover of dolly wheels, without the need for lifting the dolly by hand. These new apparatus and methods also allow the dolly wheels to be quickly and easily changed by a single person. In a first aspect of the invention, a dolly jack may include a leg attached to a foot and pivotable relative to the foot about a first axis. A jack rod is attached to the leg and may be substantially parallel to and spaced apart from the first axis. An arm can be pivotally attached to the leg as desired, to provide greater mechanical advantage in lifting the camera dolly. The leg may have fixed upper and lower positions for receiving the jack rod, with the lower position between the leg pin and the upper opening, and with the jack rod attached to the leg by securing it onto the leg at the upper position or at the lower position.

Dolly wheels may be changed using the jack inserting a jack rod into a receptacle on one side of the camera dolly, with the foot of the jack on the ground and with the jack leg substantially in a non-vertical position. The jack leg is moved or rotated into a second position wherein the jack leg is substantially vertical, lifting the side of the dolly sufficiently so that the front and back wheels, or wheel pairs, on the one side of the dolly are lifted off of the ground. The rotation of the jack leg may be achieved by pulling or pushing on the arm, if used. The wheels on the one side of the dolly are changed, and the steps are repeated on the other side of the dolly. Changing the dolly wheels can thus be quickly achieved by a single person, and without heavy lifting. Other objects, features and advantages will become apparent from the following detailed description.

BRIEF DESCRIPTION OF THE DRAWINGS

In the drawings, the same reference number indicates the same element in each of the views.

DETAILED DESCRIPTION

Figure 1:
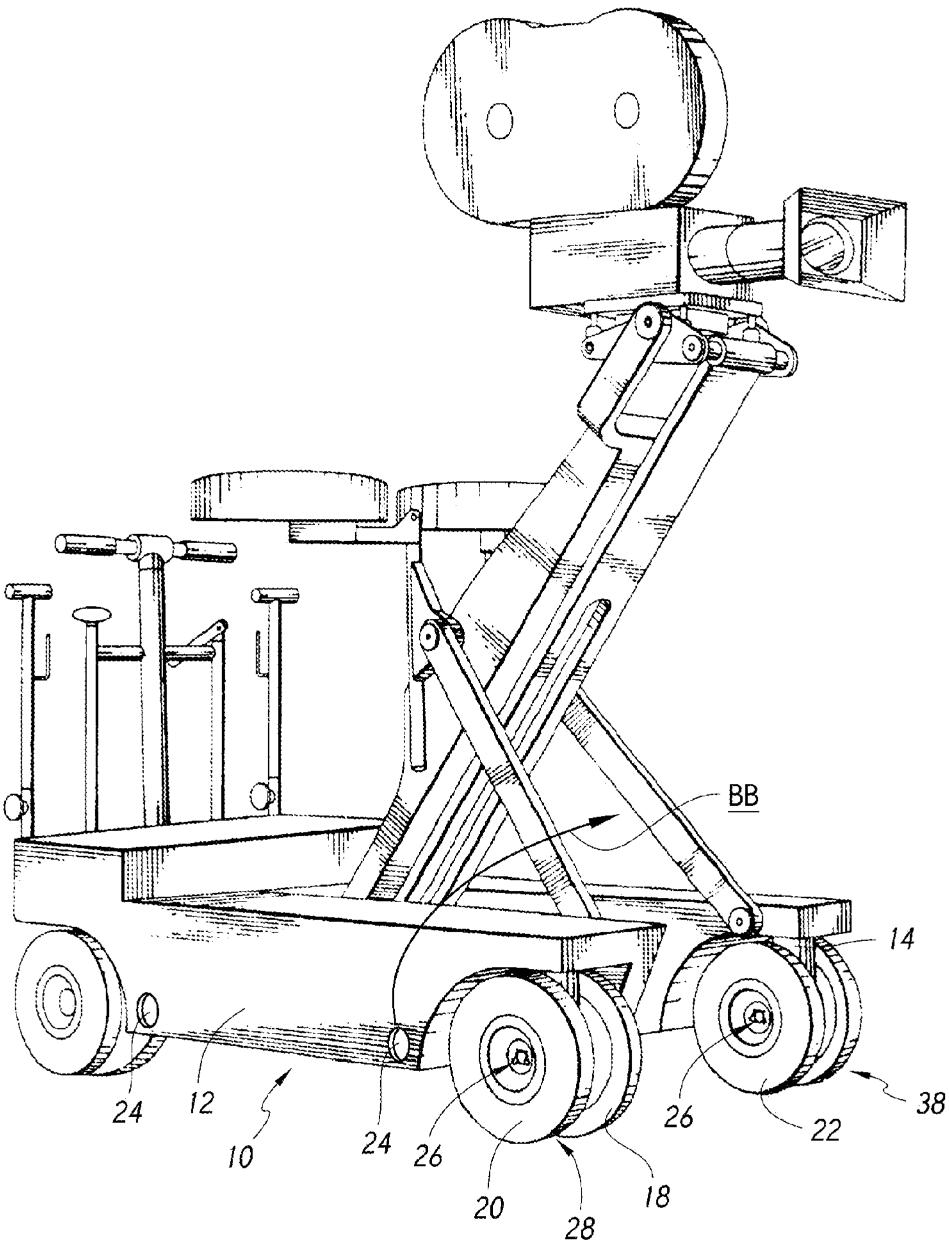
FIG. 1 (PRIOR ART)
FIGS. 1 and 2 are perspective views of prior art camera dollies.

Turning now in detail to the drawings, as shown in FIG. 1, a camera dolly 10 has a chassis 12 with a kingpin 14 at or near each of the corners of the dolly 10. An inner wheel 18 and an outer wheel 20 are rotatably supported on axles on opposite sides of each kingpin 14. The inner wheel 18 and outer wheel 20 form a wheel pair. For example, a front right side wheel pair is shown at 28, and a front left side wheel pair is shown at 38, in FIG. 1. A tire 22 is mounted on each of the wheels.

Figure 2:
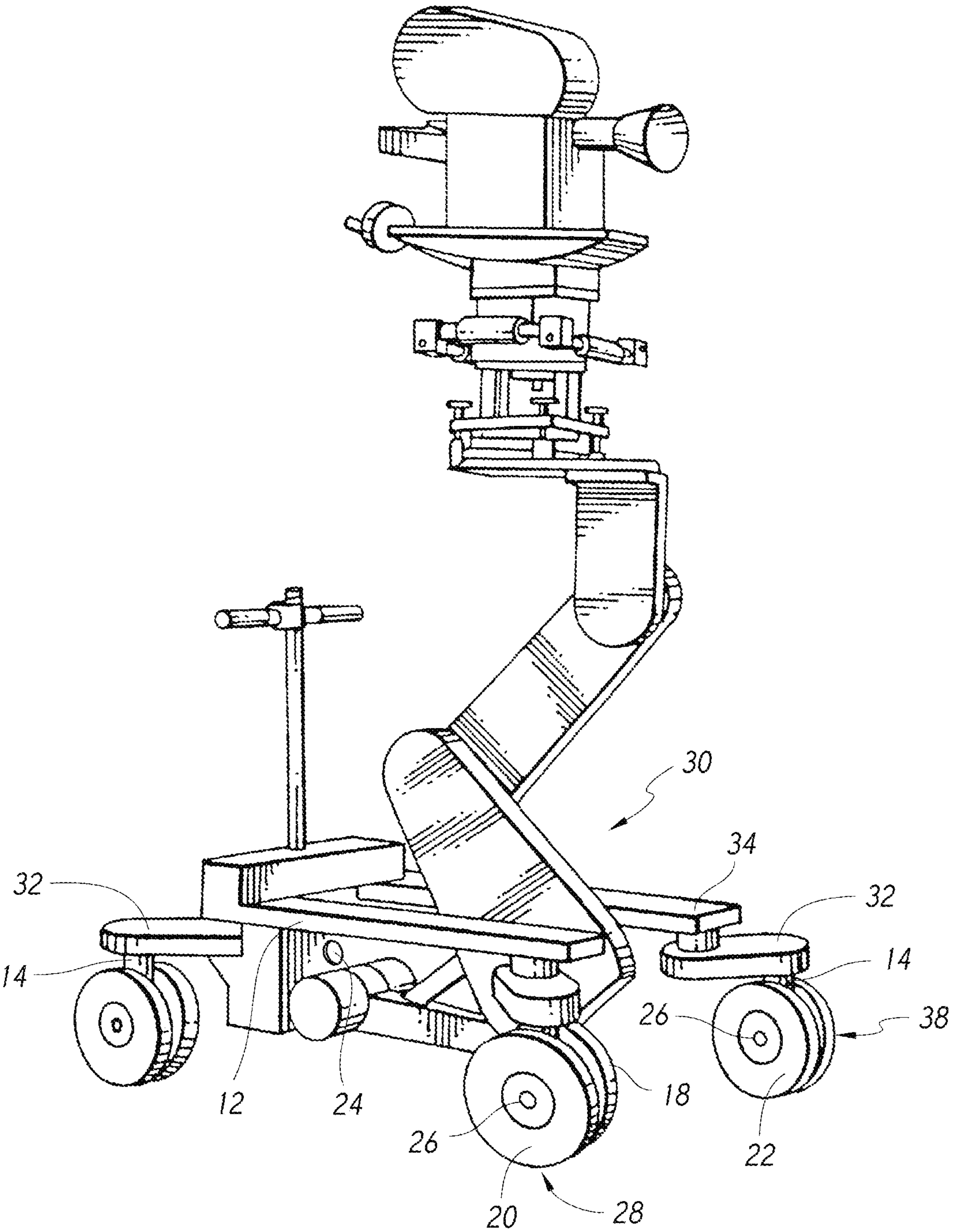
FIG. 2 (PRIOR ART)

FIG. 2 shows another type of camera dolly 30 similar to the camera dolly 30 shown in FIG. 1 but with legs 32 attached to the chassis via pivot joints 34. Both types of dollies typically have or may be provided with one or more sockets or receptacles 40 on both sides of the chassis 12. The receptacles 40 are used to attach accessories to the dolly. The accessories include seats, platforms, sideboards, etc. For example, U.S. Pat. No. 6,719,307, incorporated herein by reference, describes sideboards installed using the receptacles.

Figure 3:
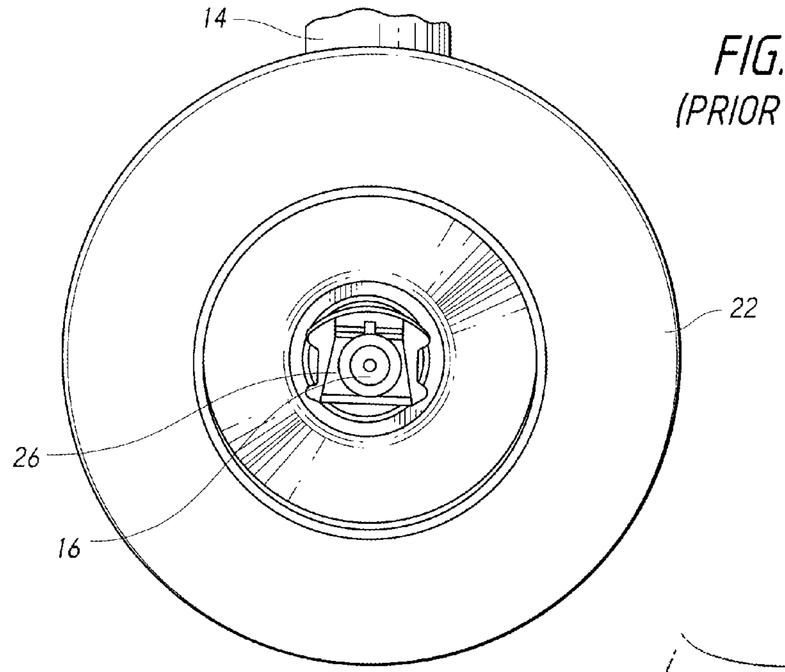
FIG. 3 (PRIOR ART)
FIG. 3 is a side view of a prior art quick change camera dolly wheel as described in U.S. Pat. No. 6,626,117.
Figure 4:
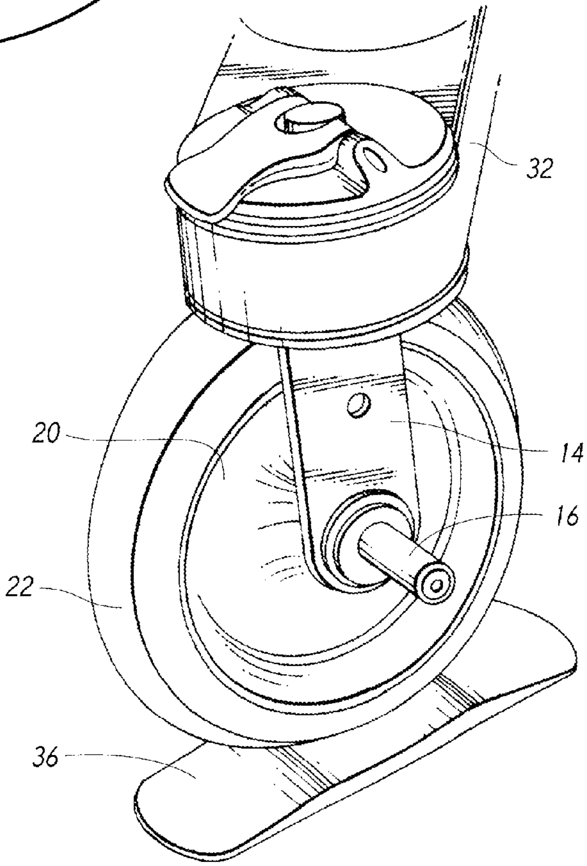
FIG. 4 (PRIOR ART)
FIG. 4 is a perspective view showing use of the quick change camera dolly wheel design of FIG. 3, using a single width wheel ramp, as also described in U.S. Pat. No. 6,626,117.

FIGS. 3 and 4 show a side view of a camera dolly quick wheel change design, from U.S. Pat. No. 6,626,117, incorporated herein by reference. This design may be used on the camera dollies 10 and 30 shown in FIGS. 1 and 2. FIG. 3 shows a quick release clip 26 that holds a wheel onto an axle 16, and that also may be quickly removed by hand, to allow the wheel to be quickly and easily removed from the axle. As shown in FIG. 4, with this design, the outer wheel 20 of a wheel pair is rolled up onto a ramp 36 to unweight the inner wheel 20 of the wheel pair. The inner wheel 20 is then removed and replaced. The outer wheel 20 is then rolled up onto the ramp 36, removed and replaced. With camera dollies having four wheel pairs, and a total of eight wheels, changing the wheels using this technique requires eight movements of the camera dolly onto and off of the ramp 36. This time consuming operation can be a significant disadvantage. Motion picture or television production often requires a large number of highly skilled professionals, and extensive amounts of equipment and supplies, so that production costs can reach several thousand dollars for each minute. Accordingly, saving even a few minutes in production time is highly significant, in terms of production costs. Moreover, in sequences involving fast changing lighting conditions, the ability to film the sequence as desired may depend on how quickly the equipment, including the camera dolly, can be set up.

Figure 5:
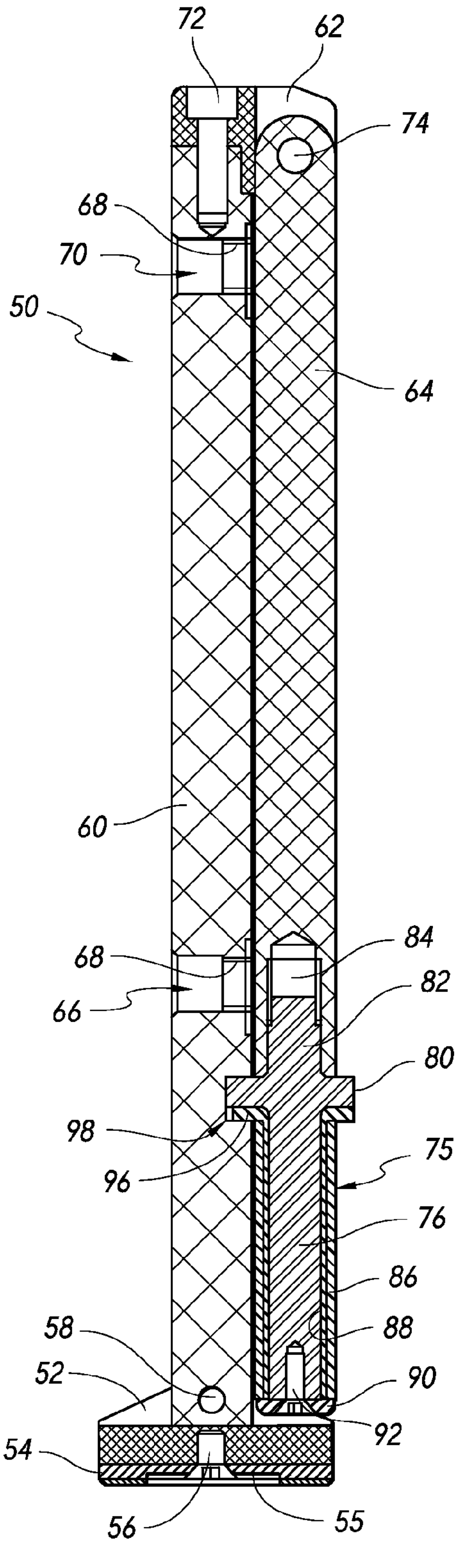
FIG. 5 is a side section view of a novel camera dolly jack, shown in the folded position.
Figure 6:
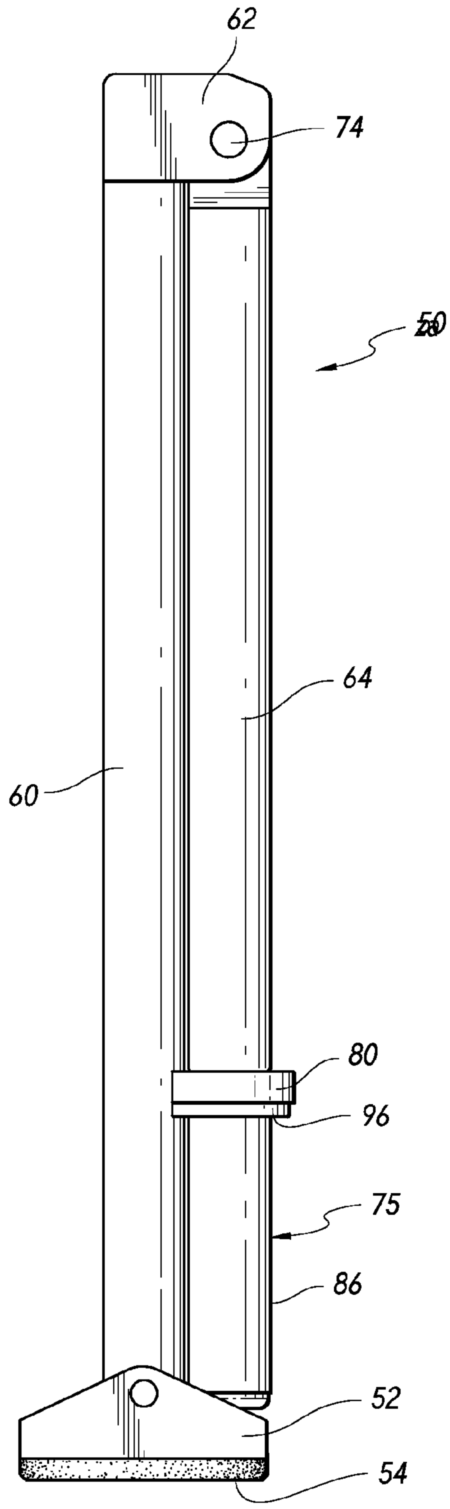
FIG. 6 is a side elevation view of the camera dolly jack as shown in FIG. 5.
Figure 7:
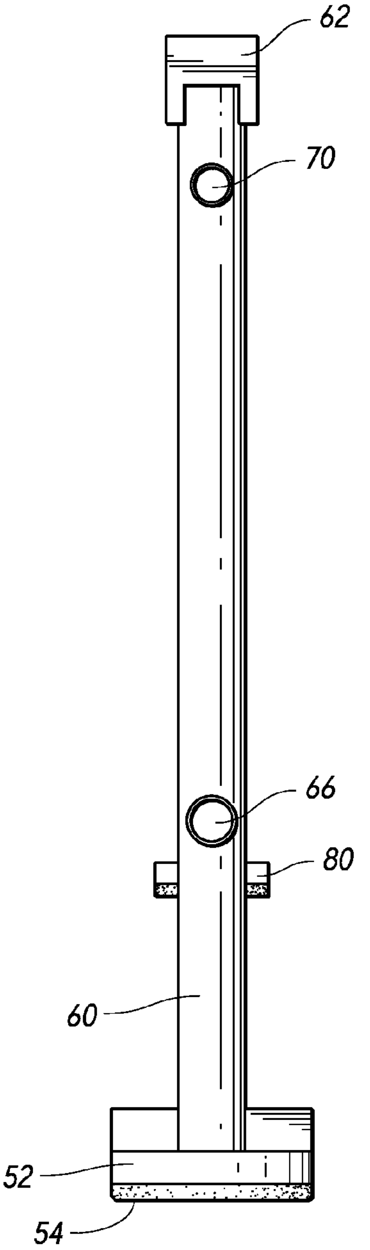
FIG. 7 is a front view of the camera dolly jack shown as in FIG. 5.

FIGS. 5-7 show a camera dolly jack 50 having a resilient pad 54 on the bottom surface of a foot 52. As shown in FIG. 5, a screw 56 is threaded into the bottom end of the leg 60 and clamps a metal pad plate 55 into a recess in the pad 54. The metal pad plate 55, if used, helps to securely hold the pad 54 onto the leg 60. The pad 54, which may be rubber, may also be attached to the leg 60 by adhesives, or by other techniques. A leg or lower section 60 is pivotally attached to the foot 52, for example via a pin 58. The leg 60 has a lower socket 66 and an upper socket 70. Each socket has an outer counter bore and an inner threaded hole 66.

An arm 64 may be used and pivotally attached to the leg 60 by a hinge fitting 62. In this example, as shown in FIG. 5, the hinge fitting 72 may be attached to the top end of the leg 60 by a bolt 72 with the arm attached to the hinge fitting 62 by an arm pin 74. This attachment may have sufficient drag to prevent the arm 64 from swinging freely, or a detent may optionally be used hold the arm 64 into desired positions. The foot 52, the leg 60 and the arm 64 may be metal. For example, the leg 60 and the arm 64 may be a ¾ inch diameter round aluminum bar or a square bar. For use with most camera dollies, the leg 60 may be 10-20 inches long. The arm 64, if used, may be the same length as the leg, or slightly shorter, to provide maximum leverage without increasing the overall folded length of the jack 50.

Figure 8:
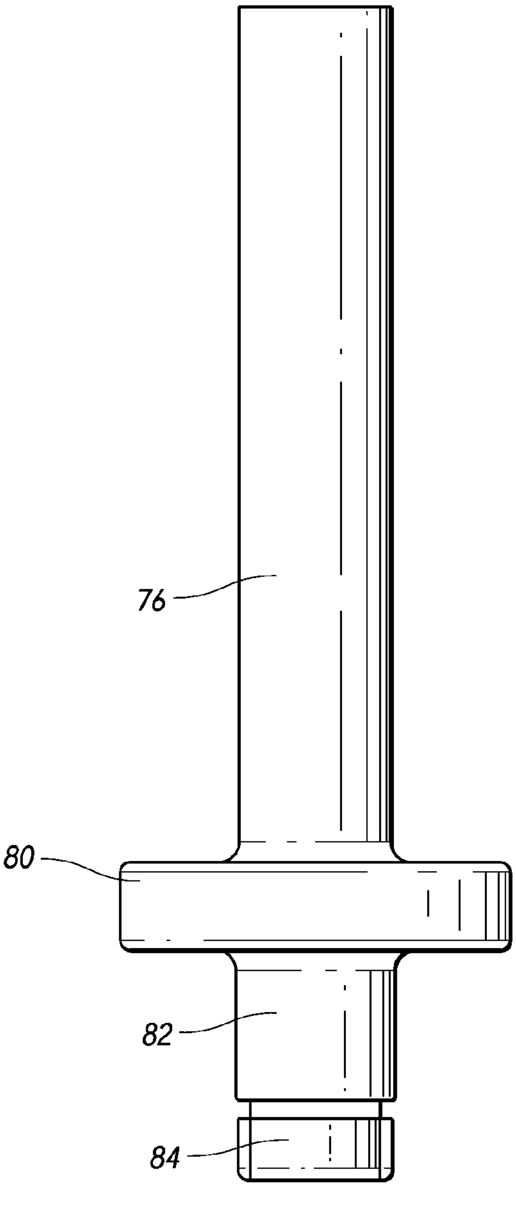
FIG. 8 is an enlarged side view of the jack rod core shown in FIG. 5.

As shown in FIGS. 5 and 8, a jack rod or segment 75 may have a metal core 76 including a knurled knob or shoulder wheel 80, a shoulder pin 82 and a threaded stud section 84. Bushings 88, such as DU bushings, are pressed into a metal sleeve 86. A Teflon (fluoropolymer) washer 96 is positioned on the core 76 next to the knob 80. The sleeve 86 with the bushings 88 is placed onto the core 76 and held on the core 76 via a Teflon end cap 90 and a cap screw 92. The sleeve 86 and core 76 may be stainless steel. The sleeve 86 can rotate on the core 76. The stud section 84 may be threaded into an opening in the end of the arm 64. A slot 98 may be provided in the back surface of the leg 60 to provide clearance for the knob 80 when the jack is in the folded position as shown in FIGS. 5 and 6. The camera dolly jack 50 as shown in FIGS. 5-7 is accordingly compact and lightweight. As a result, the jack 50 may be permanently stored on the camera dolly. The dolly operator then need not move away from the dolly, for example to a remotely stored dolly accessory kit, to have access to the jack.

Figure 9:
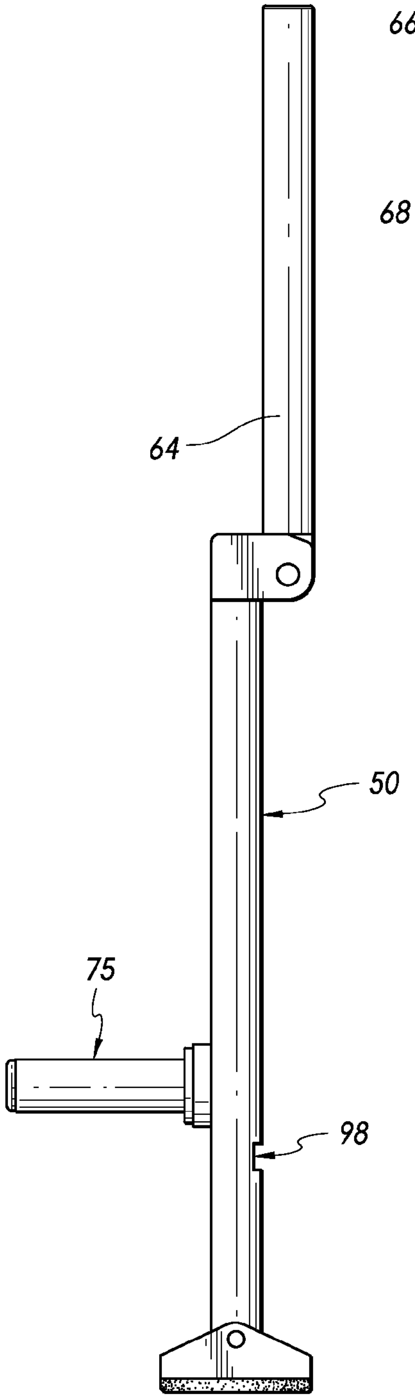
FIG. 9 is a reduced-scale side view of the camera dolly jack of FIG. 5 now shown in the unfolded position with the jack rod at the lower position.
Figure 10:
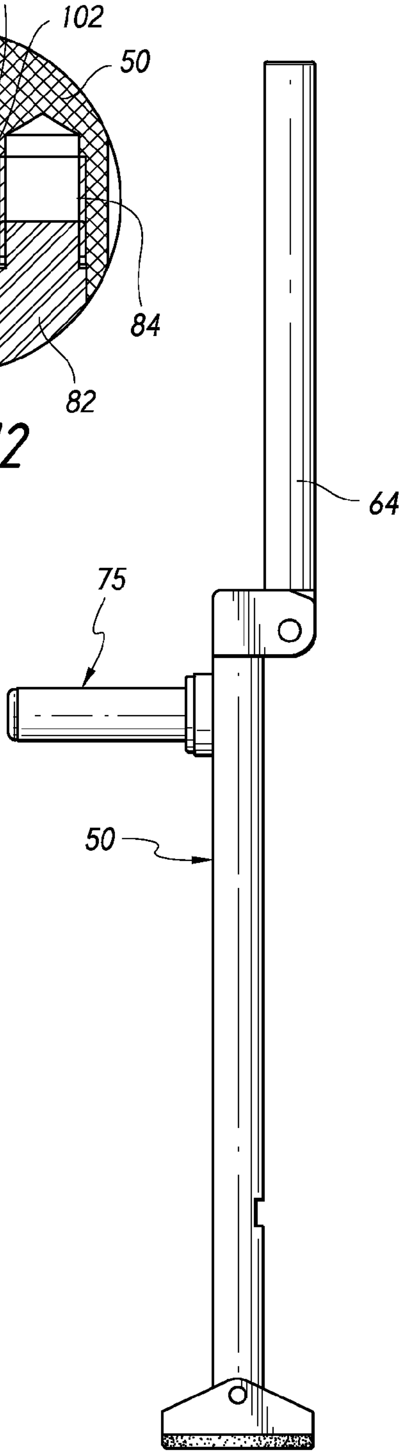
FIG. 10 is a reduced-scale side view of the camera dolly jack of FIG. 5 now shown in the unfolded position with the jack rod at the upper position.
Figure 11:
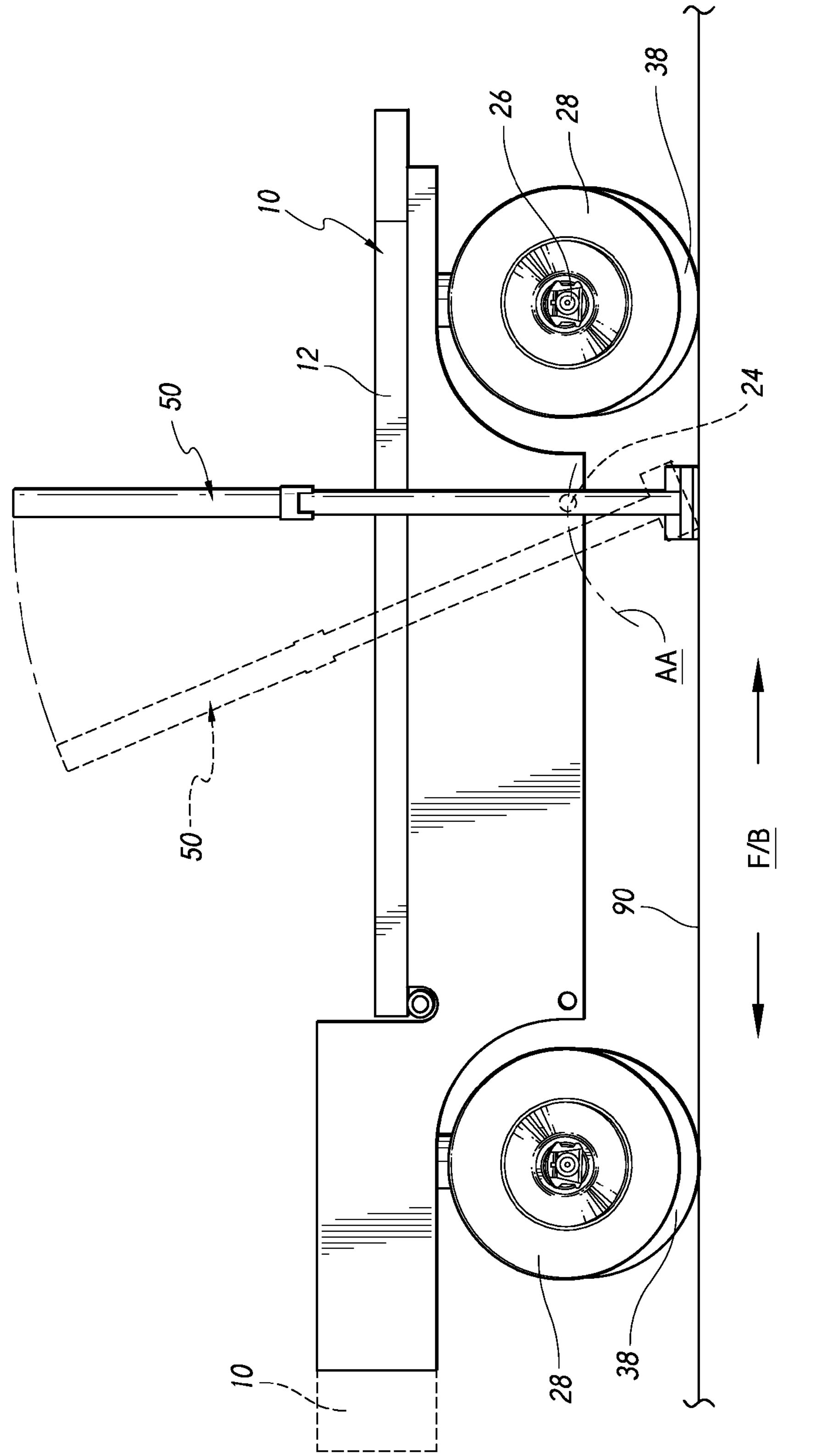
FIG. 11 is a schematic side view showing operation of the camera dolly jack shown in FIGS. 5-9.

Referring now to FIGS. 9-11, in use, the jack rod 75 is removed from the handle 64 by turning the knob counterclockwise. The jack rod 75 is then placed into the upper socket 70 or the lower socket 66 matching the height of the receptacle 24 on the camera dolly to be lifted. FIG. 9 shows the jack rod 75 in the lower socket 66 for use in lifting the type of dolly 10 shown in FIGS. 1 and 11. The engagement between the pin shoulder 82 on the jack rod 75 and the counter bore in the socket 66 or 70 aligns the stud section 84 on the jack rod 75 with the threaded hole 68 in the socket. The jack rod 75 is then turned to thread the stud section 84 into the threaded hole 68 to securely attach the jack rod 75 to the leg 60.

Figure 12:
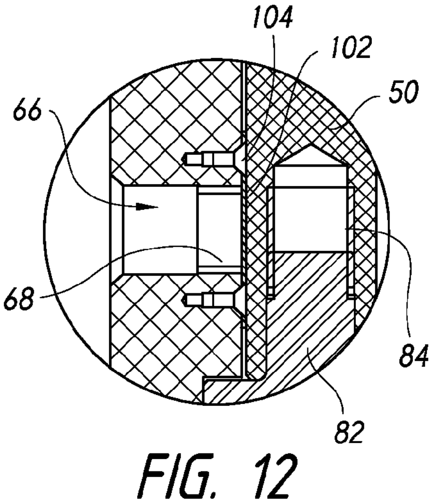
FIG. 12 is an enlarged detail view of a cover plate on the jack leg.

The alignment between the pin shoulder 82 and the counter bore helps to provide a secure structural attachment between the jack rod 75 and the leg 60. The sockets 66 and 70 may be blind holes or through holes. If through holes are used, the openings on the back side of the leg 60 may be covered over, e.g., with a cover plate 102 and screws 104, as shown in FIG. 12, to prevent the operator from inadvertently trying to install the jack rod 75 onto the back side of the leg 60. A label reminding the operator to fully insert and tighten the jack rod 75 into the leg 60 may be provided on the leg, as shown in FIG. 7.

As shown in FIG. 11, the jack rod 75 is inserted into a receptacle 24 on the camera dolly, with the leg 60 in a non-vertical position. In FIG. 11, the leg 69 is initially about 10 to 40° from vertical. The foot 52 is correspondingly at an angle to the ground, generally with only one side or edge of the foot 52 contacting the ground. The pivot axis between the foot 52 and the leg 60, or the axis of the foot pin 58, extends parallel to the front/back direction of the dolly chassis. Consequently, the foot 52 remains perpendicular to the leg 60, in the front/back axis F/B shown in FIG. 11.

To lift the dolly, the leg 60 is then rotated from the starting position, shown in dotted lines in FIG. 11, to the upright vertical position shown in solid lines in FIG. 11. This movement is achieved by manually pushing or pulling on the unfolded arm 64. During this movement, the dolly rolls (slightly forward in FIG. 11) and the jack rod 75 moves in an arc, forwardly and upwardly, as shown in FIG. 11. The leading edge of the pad 54 tends to catch against the floor and hold the jack 50 in place against sliding. If necessary, on a lower friction floor surface the operator can prevent any sliding of the foot 52 by placing the operator's foot in front of the jack foot 52.

The upward movement of the jack rod 75 lifts the right side front and rear wheel sets 28 up off of the ground. As shown in FIG. 11, when lifted by the jack 50, the right side wheels 28 are up and off of the ground 90 by for example ½ to 2 inches, and the left side wheels 38 on the opposite side of the camera dolly remain on the ground 90. The sleeve 86 on the jack rod 75 can rotate about the core 76 as the dolly is lifted. The sleeve need not rotate relative to the receptacle 24 on the dolly, thereby avoiding scoring or scraping the interior surfaces of the receptacle. Rotation of the sleeve 86 about the core 74 also prevents the jack rod 75 from becoming over-tightened into the socket 66 or 70 as the camera dolly is jacked up. As a result, the jack rod 75 can be removed from the socket by hand, even after being used to lift heavy loads.

With the leg 60 in the vertical position, the width of the foot 52 (e.g., 2-3 inches) in the front/back direction F/B, helps to stabilize the lifted dolly. If the dolly is equipped with wheel brakes, one or more of the brakes may optionally be set on, to further help to prevent inadvertent movement of the lifted dolly. Referring to FIG. 11, since the camera dolly is lift from one side, during the lifting movement, the receptacle moves forward and up along the arc AA shown in dotted lines in FIG. 11. The receptacle 24 also moves away from the jack 50 along the arc BB shown in FIG. 1. Movement on the arc BB tends to move the receptacle away from the jack rod 75, with the receptacle oriented upwardly about 1° to 5° when a typical dolly is fully lifted up.

However, as shown in FIG. 5, since the foot pin 58 is aligned in the front/back direction F/B, the leg 60 can lean in towards the dolly, as the dolly is lifted. This movement can help to keep the jack rod 75 fully inserted into the receptacle 24 and also reduce stress on the attachment between the jack rod and the leg 60. With the dolly lifted as shown in FIG. 9, all four wheels on the right side are off of the ground and can be changed over. The procedure described above is then repeated on the left side of the dolly. All eight wheels can therefore be changed with only two lifts using the jack 50.

Referring to FIGS. 2 and 10, for use with camera dolly having a receptacle higher up off of the floor, such as the dolly 30 shown in FIG. 2, the jack rod 75 is placed into the upper socket 70. The jack 50 then lifts the dolly 30 in the same way as described above. With the dolly 30 jacked up, the positions of the legs 32 may also be easily changed. The jack 50 can be used to lift any dolly having a receptacle 24. The jack may be used by a single camera dolly operator, without any tools needed.

As is apparent from FIGS. 5 and 11, the position of the jack rod 75 on the leg is selected based on the height of the receptacle 24 of the camera dolly to be lifted. Generally, the dimension from the bottom of the foot to the centerline of the jack rod 75 is ½ to 2 or 3 inches greater than the dimension from the floor 90 to the centerline of the receptacle 24.

The arm 64 acts as an extended lever on the leg 60, and it is also foldable into a convenient compact form. Other forms of arms 64 without any hinge attachment may also be used. For example, the arm 64 may be inserted into or slide over the top end of the leg 60. Alternatively, the leg 60 may simply be extended to a length that provides the desired amount of leverage. In another alternative design, the jack rod 75 may be stored as a separate piece, not attached to the arm 64. The jack rod 75 may also alternatively be permanently attached to the leg 60 at the upper or lower socket position, or a jack rod 75 may be attached at both positions. It is also possible to provide multiple sockets or other attachments for the jack rod 75 on the leg 60, so that the camera dolly jack 50 may be used with various camera dollies having receptacles at different vertical positions.

Thus, novel apparatus and methods have been shown and described. Various changes and substitutions may of course be made without departing from the spirit and scope of the invention. The invention, therefore, should not be limited, except by the following claims and their equivalents.

The invention claimed is:

1. A lifting device for a wheeled vehicle having first and second sides, and an opening in each of the first and second sides, comprising:

a foot;

a leg attached to the foot and pivotable relative to the foot about a first axis;

a cylindrical jack rod adapted to removably fit into the opening, with the lack rod rigidly attached to the leg and substantially perpendicular to the leg, and with the jack rod also substantially perpendicular to and spaced apart from the first axis; and an arm pivotally attached to the leg adjacent to an upper end of the leg and with the arm pivotable relative to the leg about a second axis.

2. The lifting device of claim 1 with the leg having fixed upper and lower threaded openings oriented substantially perpendicular to the first axis for receiving the jack rod and with the lower position between the foot and the upper position, and with the jack rod attached to the leg by threading it into the leg at the upper threaded opening or at the lower threaded opening.

3. The lifting device of claim 2 with the jack rod having a cylindrical shoulder and a threaded stud section concentric with the cylindrical shoulder, and the upper and lower threaded openings each having a counter bore.

4. The lifting device of claim 3 with the arm having a first end pivotally attached to the leg and having a second end including a counter bore and a threaded hole, and with the jack rod securable onto the second end of the arm for storage.

5. The lifting device of claim 1 with the jack rod having a plastic cover over a metal core, and a flange at a first end of the jack rod.

6. The lifting device of claim 1 with the arm and the leg having substantially the same length.

7. The lifting device of claim 1 with the second axis substantially parallel to the first axis.

8. The lifting device of claim 1 with the leg and the arm each having a length ranging from 8 to 24 inches.

9. The lifting device of claim 1 with first axis on a centerline of the leg.

10. The lifting device of claim 1 further including a hand grip at an upper end of the arm.

11. A camera dolly jack configured to engage a receptacle on a first side of a camera dolly chassis, to lift wheels of the camera on the first side of the camera dolly off of a floor with wheels on a second side of the camera dolly remain on the floor, to allow the dolly wheels on the first side of the camera dolly to be changed, comprising:

a foot having a flat bottom surface;

a first rigid jack section having an upper end and a lower end, with the lower end pivotally attached to the foot and with the first jack section pivotable about a first axis relative to the foot;

a second rigid jack section having a lower end pivotally attached to the upper end of the first rigid jack section;

a cylindrical jack rod engageable with the first rigid jack section, with the jack rod substantially perpendicular to the first rigid jack section and also substantially perpendicular to the first axis, and the jack rod insertable into and removable from the receptacle on the first side of the camera dolly, and with the jack rod spaced apart from bottom surface of the foot by a dimension greater than the vertical distance between the floor and the receptacle; and the jack lifting wheels of the camera on the first side of the camera dolly off of the floor with movement of the camera dolly in the direction of the first axis, and with wheels on the second side of the camera dolly remaining on the floor.

12. The jack of claim 11 with the first rigid jack section attached to the foot via a first pivot pin coaxial with the first axis and with the second rigid jack section attached to a hinge fitting on the first rigid jack section by a second pivot pin oriented substantially parallel to the fist pivot pin.

13. The jack of claim 11 with the jack rod having a length equal to 10% to 30% of the length of the first rigid jack section.

14. The jack of claim 13 the first and second rigid jack sections having substantially the same length.

15. The camera dolly jack of claim 11 with the second rigid jack section pivotable about an axis substantially parallel to the first axis.

16. A camera dolly and dolly jack combination, comprising:

a camera dolly having:

a chassis, a lifting arm on the chassis, and wheel pairs substantially at each corner of the chassis, and a receptacle on or in a first side of the chassis; and a jack having:

a foot having a resilient flat bottom surface;

a first rigid jack section having an upper end and a lower end, with the lower end pivotally attached to the foot and with the first jack section pivotable about a first axis relative to the foot;

a second rigid jack section having a lower end pivotally attached to the upper end of the first rigid jack section, with the second jack section pivotable from a folded position to an unfolded position; and a jack rod rigidly attached onto the first rigid jack section and substantially perpendicular to the first axis, with the jack rod insertable into the receptacle during use of the jack to lift the wheels on the first side of the camera dolly off of the ground, with the wheels on a second side of the camera dolly opposite from the first side remaining on the ground, and with the lack rod removable from the first receptacle when not in use.

17. The camera dolly and dolly jack combination of claim 16 with the jack rod spaced apart from a bottom surface of the foot by a dimension greater than the vertical distance between the receptacle and the ground.

18. A lifting device for a wheeled vehicle, comprising:

a foot;

a leg attached to the foot and pivotable relative to the foot;

a jack rod rigidly attached to the leg and substantially perpendicular to the leg, with the jack rod having a shoulder and a threaded stud section, with the leg having fixed upper and lower positions each having a counter bore and a threaded hole for receiving the jack rod and with the lower position between the foot and the upper position, and with the jack rod attached to the leg by securing it onto the leg at the upper position or at the lower position;

an arm having a first end pivotally attached to the leg adjacent to an upper end of the leg, and having a second end including a counter bore and a threaded hole, and with the jack rod securable onto the second end of the arm for storage.

19. The lifting device of claim 18 with leg pivotal about the foot on a first axis and with the arm pivotable relative to the leg about an axis substantially parallel to the first axis.

* * * * *